US012273313B2

(12) United States Patent
Savin et al.

(10) Patent No.: US 12,273,313 B2
(45) Date of Patent: Apr. 8, 2025

(54) TRANSFERRING MESSAGING CONVERSATIONS BETWEEN USER ACCOUNTS USING A SOFTWARE AS A SERVICE PLATFORM

(71) Applicant: Twilio Inc., San Francisco, CA (US)

(72) Inventors: Dmytro Savin, Tallinn (EE); Aleksandrs Ivanovs, Harjumaa (EE); Selahattin Can Çitoğlu, Tallinn (EE); Hagit Merhavi, Tel Aviv (IL); Andres Jaan Tack, Tallinn (EE); Hendrigo Ricardo de Moraes, Barcelona (ES)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/850,645

(22) Filed: Jun. 27, 2022

(65) Prior Publication Data

US 2023/0421519 A1 Dec. 28, 2023

(51) Int. Cl.
*H04L 51/216* (2022.01)
*G06F 9/54* (2006.01)

(52) U.S. Cl.
CPC ............ *H04L 51/216* (2022.05); *G06F 9/547* (2013.01)

(58) Field of Classification Search
CPC . H04L 51/216; H04L 12/00; H04L 29/08639; H04L 67/148; G06F 9/547; G06F 9/543; G06F 11/3041; H04N 1/0083; H04N 21/4431; H04N 21/4432; H04W 4/16; H04W 8/08; H04W 36/0022; H04W 36/0033; H04W 8/18; H04W 8/20; H04W 8/205
See application file for complete search history.

(56) References Cited

U.S. PATENT DOCUMENTS

| | | | | |
|---|---|---|---|---|
| 5,930,338 | A * | 7/1999 | McKendry | H04M 1/663 379/88.01 |
| 7,822,188 | B1 * | 10/2010 | Kirchhoff | H04L 65/1096 379/211.02 |
| 8,731,162 | B1 * | 5/2014 | Majd | H04L 65/104 379/212.01 |
| 10,404,759 | B1 * | 9/2019 | Liu | H04L 65/1059 |
| 10,956,910 | B2 * | 3/2021 | Fazeli | H04L 63/123 |
| 11,659,362 | B1 * | 5/2023 | Sathyanarayana Rao | H04W 4/023 455/414.1 |
| 2002/0064260 | A1 * | 5/2002 | Longman | H04M 3/42195 379/106.02 |

(Continued)

*Primary Examiner* — Michael Won
(74) *Attorney, Agent, or Firm* — Lowenstein Sandler LLP

(57) ABSTRACT

A first request to identify, among a plurality of user accounts, a subset of user accounts that are available to receive a transfer of a messaging conversation with a recipient device is received via a first application programming interface (API) call from a first client device associated with a first user account. A first response identifying the subset of user accounts that are available to receive the transfer of the messaging conversation is sent to the first client device responsive to receiving the first request. A second request to transfer the messaging conversation to a second user account identified among the subset of user accounts is received via a second API call from the first client device. The messaging conversation is transferred to the second user account to facilitate a continuation of the messaging conversation with the recipient device responsive to receiving the second request.

18 Claims, 7 Drawing Sheets

(56) References Cited

U.S. PATENT DOCUMENTS

| | | | |
|---|---|---|---|
| 2002/0073150 A1* | 6/2002 | Wilcock | H04L 67/131 709/227 |
| 2003/0068019 A1* | 4/2003 | Colemon | H04M 3/493 379/88.19 |
| 2003/0154398 A1* | 8/2003 | Eaton | G06Q 30/08 709/227 |
| 2007/0101009 A1* | 5/2007 | Chen | H04L 51/04 709/225 |
| 2007/0189220 A1* | 8/2007 | Oberle | H04L 65/1101 370/331 |
| 2007/0254625 A1* | 11/2007 | Edge | H04W 36/0022 455/404.1 |
| 2008/0034057 A1* | 2/2008 | Kumar | H04L 67/14 709/217 |
| 2008/0285088 A1* | 11/2008 | Tidwell | H04N 1/32795 358/402 |
| 2009/0034516 A1* | 2/2009 | Liu | H04M 3/58 370/353 |
| 2009/0132712 A1* | 5/2009 | P | H04L 65/1094 709/227 |
| 2009/0210536 A1* | 8/2009 | Allen | H04L 65/1094 709/227 |
| 2009/0319611 A1* | 12/2009 | Turakhia | H04L 12/1822 709/204 |
| 2010/0070641 A1* | 3/2010 | Allen | H04L 65/00 709/230 |
| 2010/0190526 A1* | 7/2010 | Marks | H04W 88/02 455/558 |
| 2011/0130168 A1* | 6/2011 | Vendrow | H04L 51/216 455/556.1 |
| 2011/0286591 A1* | 11/2011 | Fulton | H04M 3/42263 379/201.12 |
| 2012/0311026 A1* | 12/2012 | Yi | H04L 65/1063 709/203 |
| 2013/0142085 A1* | 6/2013 | Haspekian | H04L 65/1069 370/259 |
| 2013/0290932 A1* | 10/2013 | Kruglick | G06F 11/3676 717/124 |
| 2013/0297704 A1* | 11/2013 | Alberth, Jr. | H04L 67/303 709/205 |
| 2014/0156854 A1* | 6/2014 | Gaetano, Jr. | H04L 65/403 709/227 |
| 2014/0195653 A1* | 7/2014 | Alexander | H04N 21/2181 709/219 |
| 2014/0310365 A1* | 10/2014 | Sample | G06Q 10/107 709/206 |
| 2016/0094700 A1* | 3/2016 | Lee | H04W 4/80 455/419 |
| 2016/0112521 A1* | 4/2016 | Lawson | H04L 67/02 709/227 |
| 2016/0125490 A1* | 5/2016 | Angal | G06Q 30/0641 705/26.35 |
| 2016/0127499 A1* | 5/2016 | Meredith | H04L 67/306 709/224 |
| 2016/0173540 A1* | 6/2016 | Linden | H04L 67/535 709/228 |
| 2016/0301739 A1* | 10/2016 | Thompson | H04L 67/561 |
| 2017/0085519 A1* | 3/2017 | Skinner | H04L 51/52 |
| 2017/0126895 A1* | 5/2017 | Tevonian | H04M 3/58 |
| 2017/0149850 A1* | 5/2017 | Lam | H04L 65/1094 |
| 2017/0237744 A1* | 8/2017 | Chae | G06F 3/0488 726/7 |
| 2017/0353375 A1* | 12/2017 | Paropkari | H04L 43/50 |
| 2017/0366480 A1* | 12/2017 | Sagar | H04L 51/04 |
| 2018/0091655 A1* | 3/2018 | Verma | H04W 4/023 |
| 2018/0218454 A1* | 8/2018 | Simon | H04L 9/3239 |
| 2019/0140970 A1* | 5/2019 | Reston | H04L 67/14 |
| 2020/0053521 A1* | 2/2020 | Kim | H04L 65/1016 |
| 2021/0044561 A1* | 2/2021 | Tack | H04L 51/214 |
| 2021/0144252 A1* | 5/2021 | Schwarz | G06Q 10/101 |
| 2021/0243269 A1* | 8/2021 | Gibbs | H04L 67/306 |
| 2023/0144559 A1* | 5/2023 | Rodgers | H04L 67/306 709/227 |

* cited by examiner

400 

402 Receive a first request to identify, among user accounts, a subset of user accounts that are available to receive a transfer of a messaging conversation with a recipient device

404 Identify, among the user accounts, the subset of user accounts that satisfy one or more evaluation criteria

406 Send a first response identifying the subset of user accounts that are available to receive the transfer of the messaging conversation

408 Receive a second request to transfer the messaging conversation to a second user account identified among the subset of user accounts

410 Transfer the messaging conversation to a second user account to facilitate a continuation of the messaging conversation with the recipient device

412 Remove the first user account from the messaging conversation

FIG. 4

500 

502
Send a first request to identify, among user accounts, a subset of user accounts that are available to receive a transfer of a messaging conversation with a recipient device

504
Receive a first response identifying the subset of user accounts that are available to receive the transfer of the messaging conversation

506
Send a second request to transfer the messaging conversation to a second user account identified among the subset of user accounts

508
causing the transfer of the messaging conversation to a second user account to facilitate a continuation of the messaging conversation with the recipient device

FIG. 5

TRANSFERRING MESSAGING CONVERSATIONS BETWEEN USER ACCOUNTS USING A SOFTWARE AS A SERVICE PLATFORM

TECHNICAL FIELD

Aspects and embodiments of the disclosure relate to computer networking, and more specifically, to systems and methods for transferring messaging conversations between user accounts of a software as a service (SaaS) platform

BACKGROUND

Instant messaging (IM) technology can include a type of online chat allowing real-time transmission of media content over the Internet or another computer network. Messages are typically transmitted between two or more parties, when each user inputs content and triggers a transmission to the recipient(s), who may be all connected on a common network or common application. Short Messaging Service (SMS) technology can include text messaging. An SMS message is often sent from one mobile device to another over the cellular network. Multimedia Messaging Service (MMS) technology can include a way to send messages that include multimedia content to and from a device, such as a mobile phone, over a cellular network.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 4 depicts a flow diagram of an example method of transferring a messaging conversation, in accordance with some embodiments of the disclosure.

FIG. 5 depicts a flow diagram of an example method of transferring a messaging conversation, in accordance with some embodiments of the disclosure.

DETAILED DESCRIPTION

Figure 1:
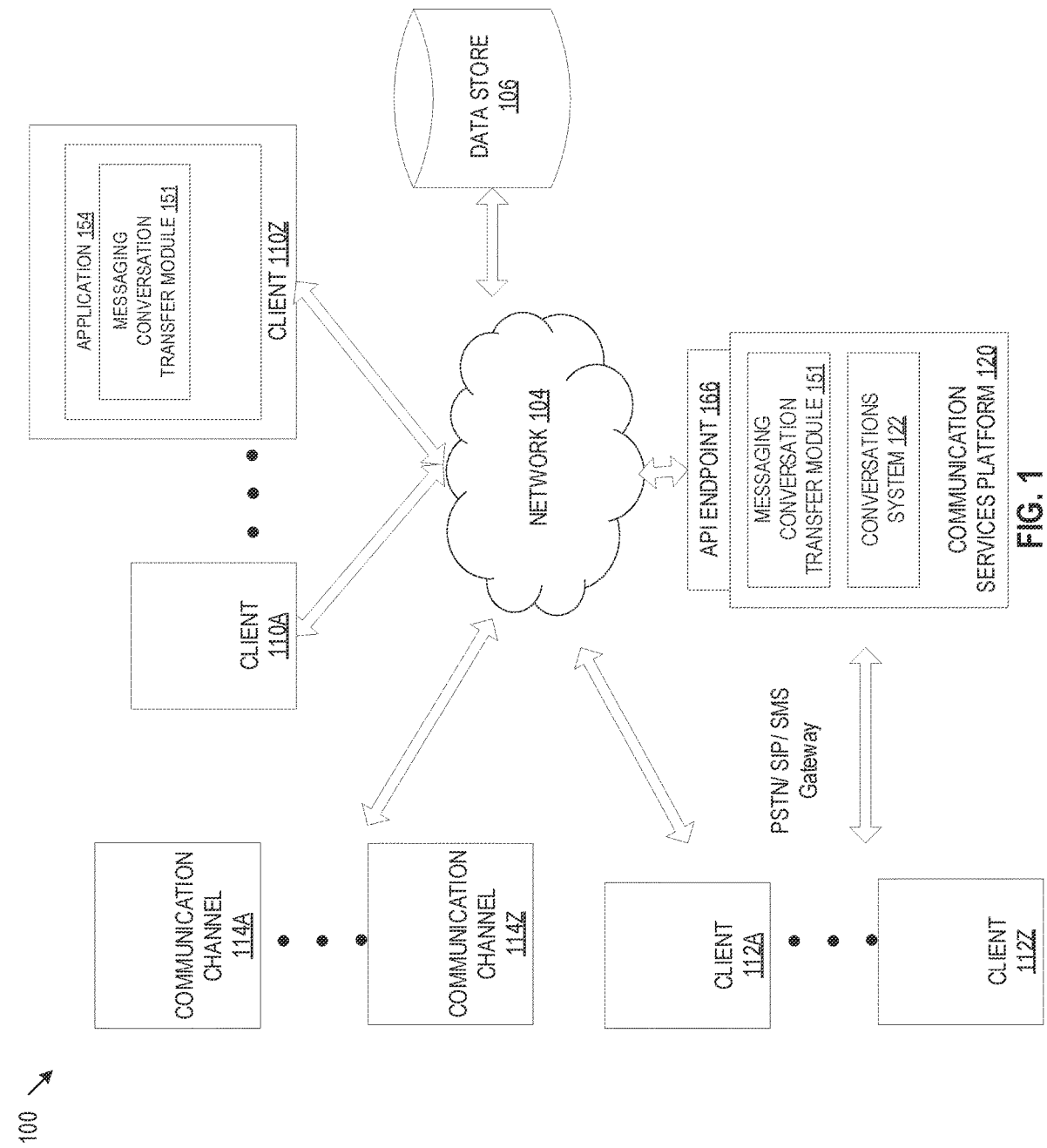
FIG. 1 illustrates an example system architecture, in accordance with some embodiments of the disclosure.

A communication platform, such as a Software as a Service (SaaS) platform, can offer various communication services to users. For example, a SaaS platform can offer users tools that facilitate the sending of messages, such as SMS messages, MMS messages, and/or IM messages, to recipient devices via various communication channels. A communication channel can refer to a form of communication that uses one or more of a particular protocol, a particular underlying technology or is provided by a particular entity (e.g., third-party entity). Different communication channels can refer to different forms of communication that can use one or more of different communication protocols, different underlying technologies (e.g., SMS vs IP), or be provided by different entities, such as a third-party entity, that offer services, software or hardware (or a combination thereof) through which messages can be sent to recipient devices. For instance, the SaaS platform may send a text message (e.g., SMS message) to a recipient device using a communication channel, such as a telecommunications carrier network or send an instant message to a recipient device using an IM communication channel (e.g., using an application programming interface (API) to communicate with the IM communication channel). Examples of channels can include Public Switched Telephone Network (PTSN) based channels such as SMS or MMS, Internet Protocol (IP) based channels, voicemail, and proprietary channels (e.g., proprietary social media messaging applications).

Two parties can conduct a messaging conversation, such as a SMS message conversation, via respective user devices. Organizations, such as companies, have increasingly adopted messaging as a valuable tool for communication within and external to the organization. In one common use case, an organization may use messaging to communicate with external customers. For example, the customer service department of a retail organization may use messaging to communicate with its customers. For instance, a customer service employee may conduct a messaging conversation (e.g., SMS messaging conversation) related to a customer service issue with a customer. In some instances, the customer service employee may have reached the end their shift or otherwise, and may need to terminate the messaging conversation before the natural conclusion of the messaging conversation (e.g., before the resolution of the customer service issue). In such an event, the customer may need to reach out to another customer service employee at a new telephone number associated with a new user device. In such circumstances, the messages of the prior messaging conversation may be lost and the customer may need to start a new messaging conversation with a new customer service employee and have to re-send similar messages to inform the new customer service employee of the situation.

Aspects of the disclosure address the above-mentioned and other challenges by allowing a first user account of multiple user accounts of an organization to conduct a messaging conversation with a recipient device, and subsequently transfer the message conversation (along with the message history), from the first user account to a second user account. Moreover, messages sent from the first user account and from the second user account can be sent using the same telephone number, such that from the perspective of the recipient device (e.g., customer) the continuity of the messaging conversation is maintained and no transfer of the messaging conversation ever occurred.

In an illustrative example, a communication services platform may allow an organization to create user accounts from which multiple messaging conversations can be conducted with various recipient devices. A communication services platform can facilitate a messaging conversation with a recipient device (e.g., between the first user account associated with a first client device and the recipient device). Further, the communication services platform can facilitate the transfer of the messaging conversation with the recipient device to a different user account (e.g., between a second user account associated with a second client device and the recipient device). To such end, the communication platform can host a telephone number or port an existing telephone number such that messages of a message conversation can be sent to or received from the recipient device, via the communication services platform, using the hosted or ported telephone number. For instance and as noted above, the customer service department of a retail organization may conduct messaging conversations with its customers. A customer service employee may be conducting a messaging conversation (e.g., SMS messaging conversation) with a customer via a communication services application executing at the employee's client device. The employee may use the communication services application to request a transfer of the messaging conversation and cause a transfer of the messaging conversation (including the messages sent and received thereof) to another user account that is selected by the employee.

To perform the above-described messaging conversation transfer, in some embodiments the communication services platform can receive a first request to identify, among a set of user accounts, a subset of user accounts that are available to receive a transfer of a messaging conversation with a recipient device. The first request is received via a first application programming interface (API) call and from a first client device associated with a first user account of the communication services platform. The message conversation can include first messages sent between the first client device and the recipient device, where the first client device uses a telephone number (also referred to as "messaging conversation telephone number" herein) provided by the communication services platform to send and receive the first messages. The message conversation can be associated with the messaging conversation telephone number, such that the communication services platform stores an entry in a record that associates the particular messaging conversation with the particular messaging conversation telephone number. A first response identifying the subset of user accounts that are available to receive the transfer of the messaging conversation is sent from the communication services platform to the first client device responsive to receiving the first request. A second request to transfer the messaging conversation to a second user account identified among the subset of user accounts is received by the communication services platform. The second request is sent via a second API call from the first client device. Responsive to receiving the second request, the messaging conversation (including the first messages) is transferred to the second user account to facilitate a continuation of the messaging conversation with the recipient device. The communication services platform can configure subsequent messages (e.g., second messages sent by the second client device to the recipient device) to be sent using the same messaging conversation telephone number that was used to send the first messages (e.g., associated with the first client device and sent prior to the messaging conversation transfer). The recipient device can use the same messaging conversation telephone number to send subsequent messages, via the communication services platform, to the second client device.

As noted, a technical problem addressed by embodiments of the disclosure is the transfer of a messaging conversation, and in particular, the transfer of the message history of the messaging conversation and the telephone number used with the messaging conversation.

A technical solution to the above-identified technical problem may include implementing messaging conversation tools, such as APIs that allow a client device to transfer, to a selected user account, the messaging conversation to continue the messaging conversation with a recipient device.

Another technical solution to the above-identified technical problem includes using a messaging conversation telephone number that can be used by the initial user account to participate in the messaging conversation and subsequently be transferred to another user account to continue the messaging conversation with the recipient device.

Thus, the technical effect may include developing the technical tools, such as APIs, that allow a client device to initiate a transfer of a messaging conversation between user accounts. Further, the technical effect may include providing the technical infrastructure that allows for the transfer of a messaging conversation (e.g., the message history) and that allows for the transfer of the messaging conversation telephone number among user accounts, which is a more efficient use of resources (e.g., compute resources, storage resources, network bandwidth, etc.) of system infrastructure (e.g., rather than losing a messaging conversation and starting a new messaging conversation with redundant message content).

FIG. 1 illustrates an example system architecture 100, in accordance with some embodiments of the disclosure. The system architecture 100 (also referred to as "system" herein) includes a communication services platform 120, a data store 106, client devices 110A-110Z connected to a network 104, client devices 112A-112Z communicatively coupled to communication services platform 120, and communication channels 114A-114Z coupled to the network 104 (or otherwise communicatively coupled to other elements of the system 100).

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client devices 110A through 110Z may also be referred to as "user devices."

In some embodiments, a client device, such as client device 110Z, can implement or include one or more applications, such as application 154 (also referred to as "client application 154" herein) executed at client device 110Z. In some embodiments, application 154 can be used to communicate (e.g., send and receive information) with communication services platform 120. In some embodiments, application 154 can implement user interfaces (e.g., graphical user interfaces (GUIs)) that may be webpages rendered by a web browser and displayed on the client device 110Z in a web browser window. In another embodiment, the user interfaces of client application 154 may be included in a stand-alone application downloaded to the client device 110Z and natively running on the client device 110Z (also referred to as a "native application" or "native client application" herein).

In some embodiments, client devices 110 can communicate with communication services platform 120 using one or more function calls, such as application programming interface (API) function calls (also referred to as "API calls" herein). For example, the one or more function calls can be identified in a request using one or more application layer protocols, such a HyperText Transfer Protocol (HTTP) (or HTTP secure (HTTPS)), and that are sent to the communication services platform 120 from the client device 110Z implementing application 154. In some embodiments, the communication services platform 120 can respond to the requests from the client device 110Z by using one or more API responses using an application layer protocol. Similarly, communication services platform 120 can communicate with one or more communication channels 114A-114Z using API function calls.

In some embodiments, one or more of client devices 110 can be identified by a uniform resource identifier (URI), such as a uniform resource locator (URL). For example, communication services platform 120 can send an API call to client device 110Z addressed to a URL specific to the client device 110Z. In some embodiments, the communication services platform 120 can be identified by a URI. For instance, the API call sent by a client device 110 to communication services platform 120 can be directed to the URL of communication services platform 120.

In some embodiments, client devices 112A-112Z (generally referred to as "client device(s) 112" herein) may be similar to client devices 110. In some embodiments, client devices 112 can include one or more telephony devices. A telephony device can include a Public Switched Telephone Network (PSTN)—connected device, such as a landline phone, cellular phone, or satellite phone, for example. In some embodiments, a telephony device can also include an internet addressable voice device (e.g., non-PSTN telephony device), such as Voice-Over-Internet-Protocol (VOW) phones, or Session Initiation Protocol (SIP) devices, for example. In some embodiments, a telephony device can include one or more messaging devices, such as a Short Message Service (SMS) network device that, for example, uses a cellular service to exchange SMS messages or Multimedia Messaging Service (MMS) messages.

In some embodiments, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some embodiments, communication services platform 120 may correspond to an elastic computing resource where the allotted capacity of processing, network, storage, or other computing-related resources may vary over time.

In some embodiments, communication services platform 120 provides one or more API endpoints 166 that can expose services, functionality or content of the communication services platform 120 to one or more of client devices 110 or communication channels 114A-114Z. In some embodiments, an API endpoint can be one end of a communication channel, where the other end can be another system, such as a client device 110Z or communication channel 114Z. In some embodiments, the API endpoint can include or be accessed using a resource locator, such a universal resource locator (URL), of a server or service. The API endpoint can receive requests from other systems, and in some cases, return a response with information responsive to the request. In some embodiments, HTTP or HTTPS methods can be used to communicate to and from API endpoint 166.

In some embodiments, the API endpoint 166 (also referred to as a "messaging request interface" herein) can function as a computer interface through which communication requests, such as message requests, are received and/or created. The communication services platform 120 may include one or more types of API endpoints.

In some embodiments, the API endpoint 166 can include a messaging API whereby external entities or systems can send a communication to create message content and/or request sending of a message. The API may be used in programmatically creating message content and/or requesting sending of one or more messages. In some embodiments, the API is implemented in connection with a multitenant communication service wherein different accounts (e.g., authenticated entities) can submit independent requests. These requests made through the API can be managed with consideration of other requests made within an account and/or across multiple accounts on the communication service.

In some embodiments, the API of the API endpoint 166 may be used in initiating general messaging or communication requests. For example, a messaging request may indicate one or more destination endpoints (e.g., recipient phone numbers), message content (e.g., text and/or media content), and possibly an origin endpoint (e.g., a phone number to use as the "sending" phone number).

In some embodiments, the API of the API endpoint 166 may be any suitable type of API such as a REST (Representational State Transfer) API, a GraphQL API, a SOAP (Simple Object Access Protocol) API, and/or any suitable type of API. In some embodiments, the communication services platform 120 can expose through the API, a set of API resources which when addressed may be used for requesting different actions, inspecting state or data, and/or otherwise interacting with the communication platform.

In some embodiments, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the communication services platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the API endpoint 166 can include a message request instruction module that can be called within an application, script, or other computer instruction execution. For example, a computing platform may support the execution of a set of program instructions where at least one instruction within a script or other application logic is used in specifying a message request and communicating that request.

In some embodiments, the API endpoint 166 can include a console, administrator interface, or other suitable type of user interface. Such a user-facing interface can be a graphical user interface. Such a user interface may additionally work in connection with a programmatic interface In some embodiments, the message request can include a data object characterizing the properties of a message. In some embodiments, the communication services platform 120 is associated with message requests that are programmatically initiated (e.g., an application-to-person (A2P) message). In some embodiments, the message request could be one initiated from an inbound received message.

In some embodiments, the message request can include one or more of one or more destination endpoints, one or more origin endpoints, and message content. In some embodiments, one or more of these properties may be specified indirectly such as through system or account configuration. For example, all messages may be automatically assigned an origin endpoint that is associated with an account. In some embodiments, the message content can include any suitable type of media content including, text, audio, image data, video data, multimedia, interactive media, data, and/or any suitable type of message content.

In an illustrative example, used for illustration rather than limitation, communication services platform 120 can include a Software as a Service (SaaS) platform that can at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some embodiments, communication services platform 120, as noted above, can provide communication services that include, but are not limited to, voice services, messaging services (e.g., SMS services or MMS services), email services, video services, chat messaging services (e.g., internet-based chat messaging services), or a combination thereof. Communication operations using the communication services can use one or more of a communication network (e.g., Internet), telecommunications network (e.g., such as a cellular network, satellite communication network, or landline communication network), or a combination thereof, to transfer communication data between parties.

In some embodiments, the conversations system 122 can function to interface with one or more communication network(s) and/or service(s) for communication of a conversation (e.g., SMS, MMS, and/or chat messaging). In some embodiments, the conversations system 122 can include an interface to one or more carrier-based communication routes used in sending SMS, MMS, and/or other carrier-based messages. There may be multiple carrier-based communication routes that serve as different optional "routes" when sending communications over a carrier-based network (e.g., a mobile network). The conversations system 122 may additionally or alternatively include an interface to one or more over-the-top (OTT) communication channels which may be offered by a third-party messaging platform (e.g., proprietary social media messaging, messaging applications, etc.).

A route can refer to a communication delivery path, defined by a series of one or more of computers, routers, gateways and/or carrier networks through which the communication is transferred from a source computer to a destination computer (e.g., through which the transmission of a message occurs). For example, the same route may be used to transfer messages using different communication channels, and the same communication channel may be used to transfer messages using different routes. In some example embodiments, different channels correspond to different applications on a receiving device. For example, a smart phone may have one application to handle SMS messages, another application to handle email, and a third application to handle voicemail. Alternatively, some applications may handle multiple communication channels. For example, one application may handle both SMS and MMS messages.

In some embodiments, when the conversations system 122 elects to send a message using a carrier-based channel, the message is communicated to an appropriate carrier connection for routing to the destination endpoint. Carrier-based channels can use SMPP (Short Message Peer-to-Peer protocol) for communicating to an aggregator or another suitable gateway such that the SMS/MMS message is transferred over a carrier network. Once transmitted to the carrier network, the message can be relayed appropriately to arrive at the intended destination. A message in transit may have multiple routing segments that are used in the delivery to an end destination device.

For example, the conversations system 122 can include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) can serve as different route options when the conversations system 122 is determining a channel and/or route to be used for one or more message transmissions.

In some embodiments, SMS Gateways can route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In some embodiments, the destination of a message may be used in determining the candidate message routes (and/or channels). For example, a phone number of a destination endpoint or another identifier associated with the intended recipient of the message may be used to identify the destination network of the intended recipient. Each destination network may be assigned a Mobile Country Code (MCC)/Mobile Network Code (MNC) pair that identifies the specific destination network In some embodiments, communication services platform 120 includes a conversations system 122 that can use the phone number associated with the intended recipient of the message to lookup the MCC/MCN pair identifying the destination network. For example, the conversations system 122 can determine the MCC/MNC pair using an MCC/MNC directory that lists the MCC/MNC pair corresponding to each phone number. In some embodiments, the MCC/MNC directory may be stored in a routing provider storage. Alternatively, the MCC/MNC directory may be stored at some other network accessible location. In either case, the conversations system 122 can use the phone number associated with the intended recipient of the message to query the MCC/MNC directory and identify the MCC/MNC pair that identify the corresponding destination network.

In some embodiments, the conversations system 122 can use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the conversations system 122 and the corresponding routing providers and routes available for use with each MCC/MNC pair. That is, the routing provider directory can list the routing providers and routes that are available to the conversations system 122 to deliver messages to the destination network identified by each MCC/MNC pair listed in the routing provider directory.

In some embodiments, communication services platform 120 can include a multitenant system. Multitenancy can refer to a mode of operation of software applications where multiple independent instances of one or multiple applications operate in a shared computer environment. In some embodiments, the instances (tenants) can be logically isolated, but physically integrated. The degree of logical isolation can be complete, but the degree of physical integration can vary. The tenants (application instances) can be representations of organizations that obtain access to the multitenant system. The tenants may also be multiple applications competing for shared underlying resources. Multiple organizations can access the resources of communication services platform 120 without any indication that the resources are shared between the multiple organizations. The data of each of the organizations can be logically isolated from one another such that each organization has access to their own data but not the data of other organizations in the multitenant system. In some embodiments, communication services platform 120 can include a single tenant system.

An organization can be an example of an entity, such as a legal entity, that includes multiple people and that has a particular purpose. A non-limiting example of an organization includes a corporation (e.g., authorized by law to act as a single entity or legal entity). In some embodiments, multiple organizations can include one or more organizations that are independent or distinct from the other organizations. For example, a first organization can be corporation A and a second organization can be corporation B. Corporation A can be considered an independent legal entity from corporation B. Each of corporation A and corporation B can make independent decisions and have a different legal or corporate structure.

In some embodiments, a "user" may be represented as a single individual. However, other embodiments of the disclosure encompass a "user" being an entity controlled by a set of users and/or an automated source. For example, a set of individual users federated as one or more departments in an organization may be considered a "user." In general, functions described in one embodiment as being performed by the communication services platform 120 can also be performed on the client devices 110A through 110Z in other embodiments (and vice versa), if appropriate. In addition, the functionality attributed to a particular component can be performed by different or multiple components operating together. The communication services platform 120 can also be accessed as a service provided to other systems or devices through appropriate APIs.

As noted above and in some embodiments, a communication channel can refer to an entity, such as a third-party entity (e.g., organizations different from communication services platform 120), that offers services, software or hardware (or a combination thereof) through which messages can be sent to recipient devices. (e.g., organizations different from communication services platform 120). A third party can refer to an entity, such as organization or business (e.g., a different legal entity than communication services platform 120) that is distinct from another entity, such as the entity controlling or owning the communication services platform 120. In some embodiments, the communication services offered by communication channels 114A-114Z can be integrated into communication services platform 120. In some embodiments, the communication services offered by communication channels 114A-114Z can include messaging services. In some embodiments, messaging services can include one or more of a short messaging service (SMS) offered by an SMS channel, a multimedia messaging service (MMS) offered by an MMS channel, or an instant messaging service (e.g., chat messaging) offered by an instant messaging service channel. In some embodiments, an instant messaging service is different from an electronic mail (email) service. In some embodiments, the communication channels 114A-114Z can include an email channel. In some embodiments, the communication channels 114A-114Z exclude an email channel.

In some embodiments, email messages can use a standard protocol for sending and receiving email messages. The standard protocol can be used across different platforms. In some embodiments, instant messages can use protocols specific to a platform that may or may not be compatible with other platforms. In some embodiments, instant messaging can differ from email in that conversations over instant messaging can happen in real-time, while conversations over email are not in real-time.

In another illustrative example, client device 110Z may want to send an SMS message. In some embodiments, communication services platform 120 and/or client devices 110 include an instance of messaging conversation transfer module 151. In some embodiments, messaging conversation transfer module 151 of client device 110Z, of communication services platform 120, or a combination thereof can perform one or more aspects of the disclosure.

Although embodiments of the disclosure are discussed in terms of communication service platforms, embodiments may also be generally applied to any type of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Figure 2:
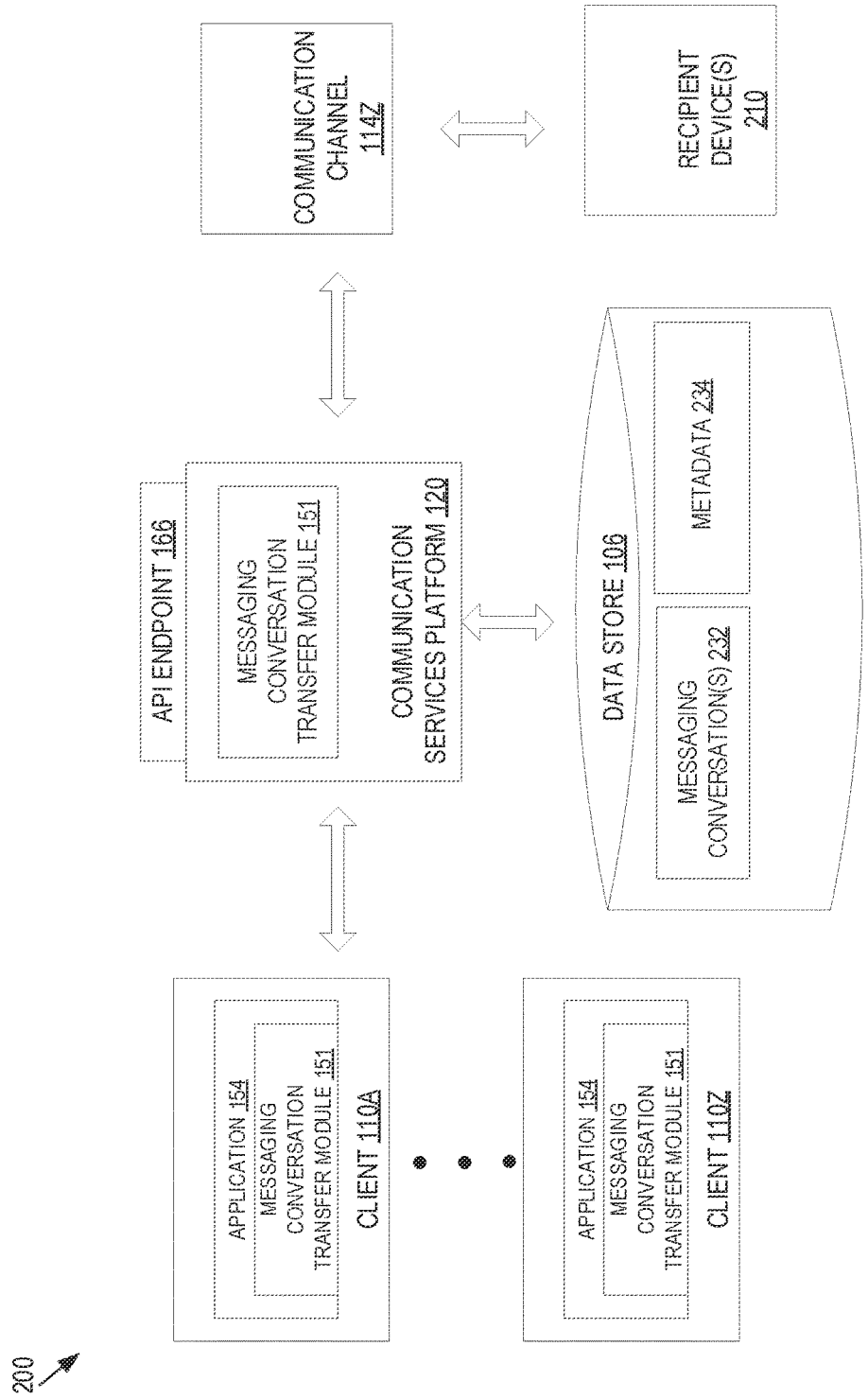
FIG. 2 illustrates an example system architecture used to transfer messaging conversations, in accordance with some embodiments of the disclosure.

FIG. 2 illustrates an example system architecture 200 used to transfer messaging conversations, in accordance with some embodiments of the disclosure. Components of FIG. 1 are used to help describe aspects of FIG. 2. The system architecture 200 (also referred to as "system" herein) includes a communication services platform 120, a data store 106, one or more client devices 110A through 110Z, one or more communication channels 114Z and one or more recipient devices 210. Recipient devices 210 can be similar to client devices 110A-110Z or client devices 112A-112Z, as described with respect to FIG. 1.

As illustrated, client devices 110 can communicate with communication services platform 120 using application 154. In some embodiments, instances of application 154 are provided by communication services platform 120 to client device 110A through 110Z to facilitate messaging conversations between one or more of client device 110 and recipient devices 210.

In an illustrative example, users of client devices 110 can be part of an organization that uses one or more communication services provided by communication services platform 120. The users of the client devices 110 can each be assigned a user account that is associated with the organization and that allow access the communication services provided by communication services platform 120. The organization may use the communication services platform 120 to facilitate messaging conversations with end users (e.g., customers represented by recipient device 210). For instance, client device 110A, via application 154, can conduct a text messaging conversation with a customer (e.g., recipient device 210).

As described above, a user of client device 110A (associated with user account A) may be ending their current shift and desire to transfer the messaging conversation to another user of the organization to maintain continuity of messaging conversation. Using aspects as described herein, the user of client device 110A can transfer the messaging conversation to another user account, such as user account Z associated with client device 110Z, such that the continuity of the messaging conversation is maintained. In some embodiments, the history of the messaging conversation can be transferred to user account Z. In some embodiments, a single telephone number can be used by both client device 110A and client device 110B to conduct the messaging conversation c. For instance, the messages of the messaging conversation from client device 110A can appear at the recipient device 210 as from telephone number XXX-AAA-BBBB. After transferring the messaging conversation, the messages of the messaging conversation from client device 110Z can appear at the recipient device 210 as from the same telephone number XXX-AAA-BBBB. Transferring a messaging conversation is further described with respect to FIG. 3A.

In some embodiments, the messaging conversations of an organization can be managed by an individual or group of individuals using application 154 of a client device 110. For example, a graphical user interface (GUI) can be presented at client device 110Z, via application 154, that displays active messaging conversations between one or more client devices 110 and respective one or more recipient devices 210. A particular client device 110, using the application 154 can view the multiple messaging conversations and transfer a particular messaging conversation from one user account associated with the particular client device to another user account associated with another client device (even if client device 110Z is not participating in the transferred messaging conversation). For example, client device 110A, via application 154, may be having a messaging conversation with recipient device 210. Client device 110Z may implement a message manager via application 154 and view all the active messaging conversations of an organization including the messaging conversation of client device 110A. Client device 110Z may receive a notification that client device 110A may no longer participate in the messaging conversation with recipient device 210. In response, client device 110Z may initiate a transfer of the messaging conversation with recipient device 210 to another client device 110B (e.g., user account B). In some embodiments, the history of the messaging conversation can be transferred to user account B. In some embodiments, the telephone number associated with the messaging conversation can also be transferred to user account B. A message manager implementation for transferring a messaging conversation is further described with respect to FIG. 3B.

In some embodiments, data store 106 can include one more messaging conversations 232. Each messaging conversation 232 can include messages (e.g., the message content thereof). For example, the message content of a text message can include the text content that is displayed at one or more of the sender's device or recipient's device (e.g., "Hello, friend!").

In some embodiments, data store 106 can include metadata associated with the one or more messaging conversations 232. Metadata associated with a messaging conversation can include metadata associated with the messaging conversation generally and/or metadata associated with individual messages of a messaging conversation. Metadata can refer to one or more of messaging conversation metadata or message metadata, unless otherwise described.

In some embodiments, the messaging conversation metadata can include a messaging conversation identifier that identifies the messaging conversation. In some embodiments, the messaging conversation identifier can include one or more a unique identifier that is specific to the particular messaging conversation and a telephone number (also referred to as a "messaging conversation telephone number" herein) that is associated with the messaging conversation. The messaging conversation telephone number can be a telephone number, such as a 10-digit telephone number or short code number. In some embodiments, the messages sent from multiple client devices 110 to a recipient device 210 can be identified by the recipient device 210 as originating from the same messaging conversation identifier (e.g., the same messaging conversation telephone number).

In some embodiments, the messaging conversation can be transferred between two or more user accounts of the communication services platform 120. For example, the messaging conversation with the recipient device 210 can start at client device 110A where several messages are sent from client device 110A to recipient device 210 and are identified at the recipient device 210 as being sent from telephone number A. For instance, communication services platform 120 sends the messages from client device 110A to recipient device 210 using telephone number A. The messaging conversation can subsequently be transferred to client device 110Z by communication services platform 120 where messages that are sent from client device 110Z to recipient device 210 are also identified by recipient device 210 as being sent from telephone A.

In some embodiments, the metadata can include an identifier of a destination endpoint of a message (e.g., a recipient's telephone number or IP address, etc.). In some embodiments, the message metadata can include an identifier of an origin startpoint (also referred to "startpoint identifier" herein) of a message (e.g. a sender's carrier telephone number or IP address). In some embodiments, the metadata can include an identifier of the communication services platform 120, such as a URL that identifies the communication services platform 120 or a service thereof. In some embodiments, messaging conversation history can refer to one or more of messaging conversations 232, the messages of one or more message conversations 232, message metadata or messaging conversation metadata.

In some embodiments, the metadata can include one or more user account identifiers identifying user accounts that participated or are participating in the messaging conversation. In some embodiments, the metadata can include the user names of the participants of the messaging conversation. In some embodiments, the metadata can include the time and date the messaging conversation was created. In some embodiments, the metadata can include an identifier of the user (e.g. user account) that created the messaging conversation. In some embodiments, the metadata can include the time and date each message of a messaging conversation was sent. In some embodiments, the metadata can include information that identifies the user account that initiated the transfer of the messaging conversation, the user account from which the messaging conversation was transferred, and/or the user account to which the messaging conversation is transferred.

It can be noted that in some embodiments, the telephone number used as a messaging conversation identifier may not be the actual telephone number that is associated with the client devices 110 (e.g., telephone number assigned to the client device 110 by the telecommunications carrier). In another example, the client device 110 can be a desktop computer that does not have a telephone number assigned by a telecommunications carrier. Rather, the client device 110 can be identified by an internet protocol (IP) address and can send messages of the message conversation using HTTP over TCP/IP (transmission control protocol), for example.

For example, the client device 110Z can be a mobile phone that has a telephone number assigned by the carrier (e.g., carrier telephone number Z). Client device 110Z (e.g., user account Z) can send a message of the messaging conversation, via communication services platform 120 to the recipient device 210 using the carrier telephone number Z. The message can be initially received by the communication services platform 120 using a communication services platform identifier, such as a URL. The communication services platform 120 can determine the messaging conversation telephone number (e.g., telephone number B) based on the metadata associated with the message (sent with the message) or a record (e.g., lookup table) that associates the account number Z with the messaging conversation telephone number, for example. Communication services platform 120 can send the message to the recipient device 210 using the messaging conversation telephone number (e.g., telephone number B) (rather than the carrier telephone number Z associated with client device 110Z). In some embodiments, communication services platform 120 can assign and re-assign the messaging conversation telephone number (e.g., telephone number B) to different users accounts, so that messages sent on behalf of different user accounts are sent from the same telephone number (e.g., messaging conversation telephone number).

In another example, the client device 110Z can receive a message of a messaging conversation from recipient device 210. Recipient device 210 can direct the message to the client device 110Z using the messaging conversation telephone number (e.g., telephone number B). The message can be received by communication services platform 120. Communication services platform 120 can use the messaging conversation telephone number to identify the destination endpoint identifier (also referred to "endpoint identifier" herein). For instance, the endpoint identifier can include one or more of the user account associated with the messaging conversation or the identifier of the client device 110Z associated with the user account (e.g., carrier telephone number of the client device 110Z or IP address associated with the client device 110Z). The communication services platform 120 can use a record, such as a lookup table that associates the messaging conversation telephone number with the endpoint identifier. Communication services platform 120 can send the message to client device 110Z using the endpoint identifier (e.g., carrier telephone number of client device 110Z or IP address). As noted above, the carrier telephone number of the client device 110Z may be different from the messaging conversation telephone number, in some embodiments.

Figure 3A:
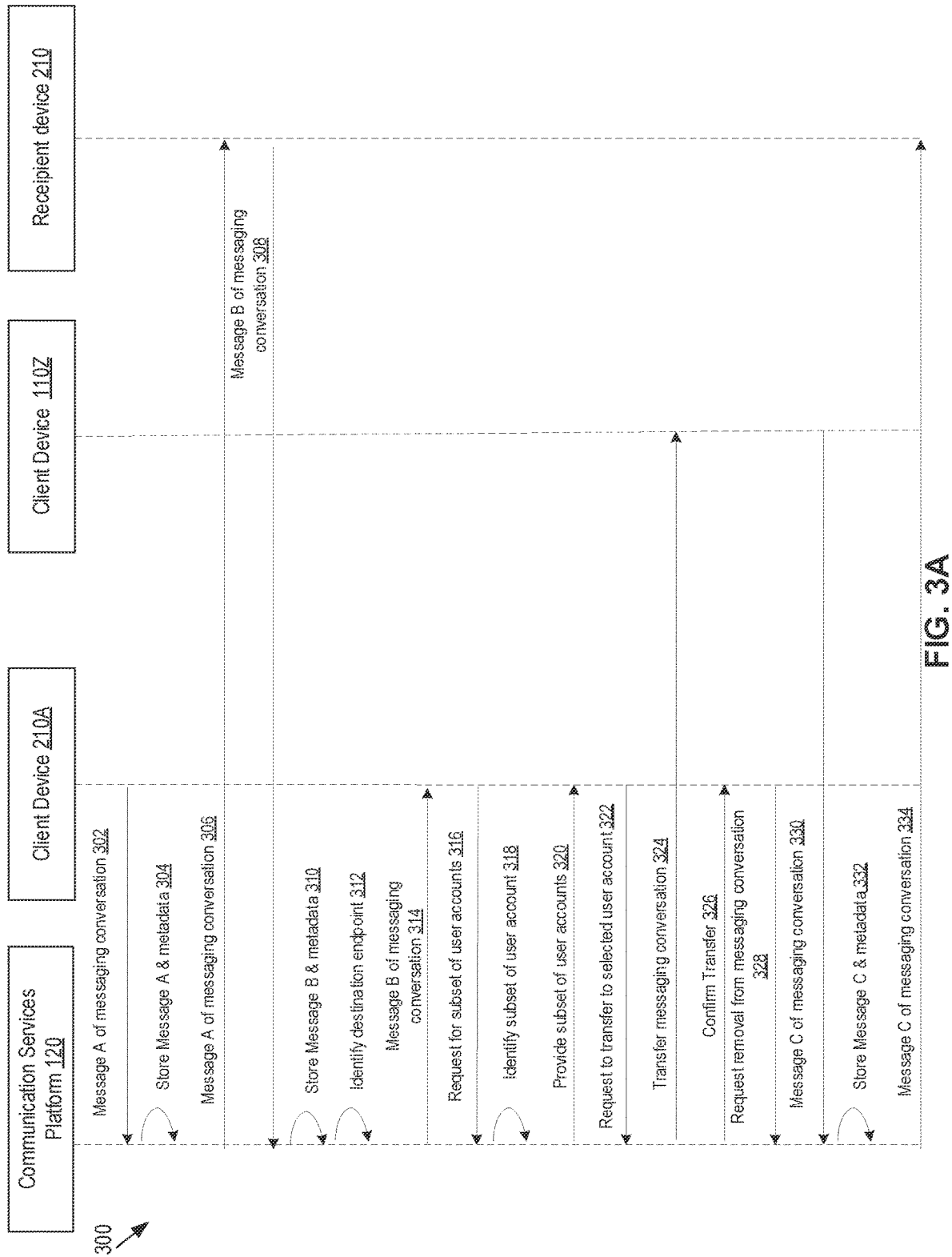
FIG. 3A illustrates a sequence diagram of communications between components of a system to transfer a messaging conversation, in accordance with embodiments of the disclosure.
Figure 3B:
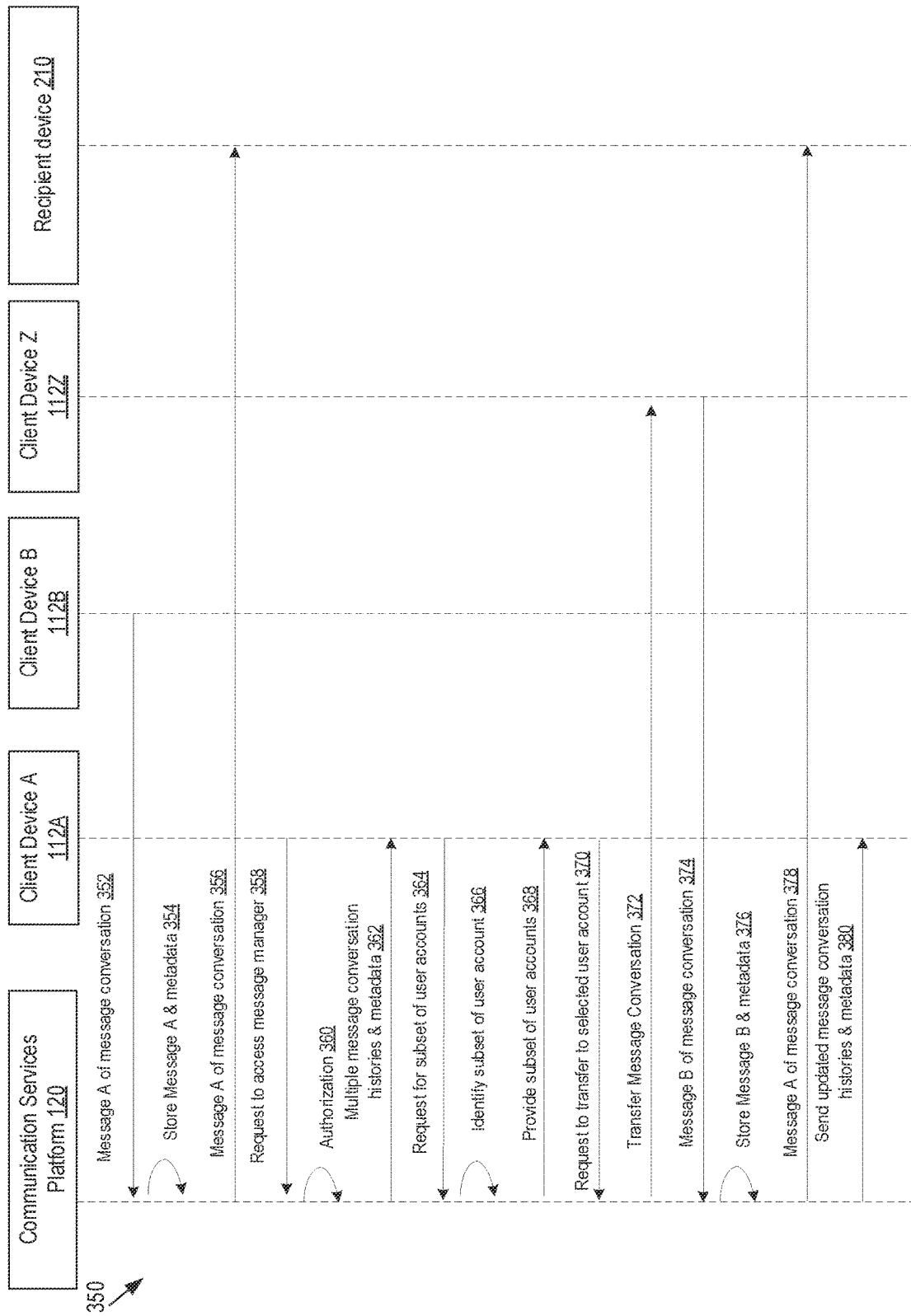
FIG. 3B illustrates a sequence diagram of communications between components of a system to transfer a messaging conversation using a messaging manager, in accordance with embodiments of the disclosure.

Elements of FIG. 1 and FIG. 2 are used with respect to FIG. 3A and FIG. 3B to help describe features of diagrams 300 and 350. The operations described with respect to FIG. 3A and FIG. 3B at diagrams 300 and diagram 350, respectively, are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

FIG. 3A illustrates a sequence diagram of communications between components of a system to transfer a messaging conversation, in accordance with embodiments of the disclosure. Diagram 300 illustrates communication services platform 120, client device 110A, client device 110Z, and recipient device 210. In some embodiments, one or more of communication services platform 120, client device 110A, or client device 110Z using application 154, an in particular messaging conversation transfer module 151 implement the operations depicted in diagram 300. In some embodiments, client device 110A using client account A conducts a messaging conversation with recipient device 210. In some embodiments, the messaging conversation can include messages using one of a short messaging service (SMS) channel, a multimedia messaging service (MMS) channel, or an instant messaging service channel. In some embodiments, the messaging conversation excludes communication using an electronic mail (e-mail) channel.

In some embodiments, a messaging conversation can be associated with a telephone number such that the same telephone number can be used by both client device 110A and client device 110Z to send messages related to the messaging conversation, as described above with respect to FIG. 2 and further below.

In some embodiments, at operation 302 client device 110A (e.g., client account A) sends a message A, such as an SMS message, of a messaging conversation to recipient device 210 via communication services platform 120. In some embodiments, the message is sent by client device 110A using an API call directed to a URL associated with the communication services platform 120. At operation 302, to send message A via communication services platform 120, client device 110A can send message information that includes the message (e.g., message content) and metadata.

For example, the client device 110A can send the message content and metadata including one or more of the startpoint identifier (e.g., carrier telephone number of client device 110A), endpoint identifier (e.g., telephone number of the recipient device 210) and the messaging conversation identifier (e.g., messaging conversation telephone number that may be different than the startpoint identifier).

In another example, client device 110A can display a GUI, via application 154, having a messaging element GUI that allows a user of client device 110A to send and receive messages on behalf of the corresponding user account (e.g., user account A). The user can enter message content into the messaging element GUI and send the message content to a designated recipient (e.g., endpoint).

At operation 304, communication services platform 120 can store the message (e.g., message A) and the metadata at data store 106, for example. For example, the message (e.g., message content) and metadata can be stored and associated with the messaging conversation telephone number (or the messaging conversation identifier, generally).

At operation 306, communication services platform 120 can send message A to recipient device 210 using the endpoint identifier provided in operation 302. For example, communication services platform 120 can send the SMS message to the telephone number of recipient device 210. The endpoint identifier (e.g., telephone number of the recipient device 210) can be identified from the message metadata corresponding to the message received from client device 110Z.

At operation 308, recipient device 210 sends a message (e.g., message B) to client device 110A, via communication services platform 120. Recipient device 210 sends the message to the messaging conversation identifier, such as the messaging conversation telephone number, identified in the message A. As described above with respect to FIG. 2, the messaging conversation telephone number can be a telephone number that is hosted or ported by communication services platform 120. As such sending a message to the messaging conversation telephone number directs the message to communication services platform 120.

At operation 310, communication services platform 120 can store the message (e.g., message B) and the metadata at data store 106, for example. For example, the message (e.g., message content) and metadata can be stored and associated with the messaging conversation telephone number (or the messaging conversation identifier, generally).

At operation 312, communication services platform 120 can identify a destination endpoint for message B. In some embodiments, communication services platform 120 can use the messaging conversation telephone number associated with message B to identify the user account and/or the endpoint identifier (e.g., carrier telephone number or IP address of client device 110A, etc.) associated with the user account. Additional details regarding identifying a destination endpoint associated with a message is further described above with respect FIG. 2.

At operation 314, communication services platform 120 sends the message (e.g., message B) to client device 110A using the endpoint identifier. Communication services platform 120 can also send metadata with the message, such as the messaging conversation telephone number and a unique identifier associated with the message conversation.

At operation 316, client device 110A sends a request to communication services platform 120 to identify, among a set of user accounts associated with the organization, a subset of user accounts that are available to receive a transfer of the messaging conversation with recipient device 210. For example, a user of client device 110A can select a GUI element of application 154 that causes client device 110Z to send an API call to communication services platform 120 that requests the identification of the subset of user accounts.

At operation 318, communication services platform 120 identifies, among the user accounts associated with the organization, a subset of user accounts that are available to receive the transfer of the messaging conversation with recipient device 210. In some embodiments, to identify the subset of user accounts, communication services platform 120 can identify, among user accounts, a subset of user accounts that satisfy one or more evaluation criterion. In some embodiments, an evaluation criterion can include whether a user account is logged in (e.g., user of the user account has logged in) to application 154. If the user account is logged in to communication services platform 120 via application 154, the criterion is satisfied. If the user account is not logged in, the criterion is not satisfied. In some embodiments, an evaluation criterion can be based on an activity status. An activity status can indicate whether a user is currently active on application 154 (e.g., recently browsing or using features). Activity status can be measured by one or more activity metrics such as number of times the user has used application in during a specified time period (e.g., used the application in the last 30 minutes). If the user is active based on the activity status, the criterion is satisfied. If the user in not active based on the activity status, the criterion is not satisfied.

At operation 320, communication services platform 120 can send a response to the request described with respect to operation 316. In some embodiments, communication services platform 120 can send a response (e.g., HTTP response) to client device 110A that identifies the subset of user accounts that are available to receive the transfer of the messaging conversation. In some embodiments, communication services platform 120 can send user account identifiers of the subset of user accounts.

At operation 322, client device 110A can send a request to communication services platform 120 to transfer the messaging conversation to a user account selected among the subset of user accounts provided by communication services platform 120 at operation 320. In some embodiments, the request can be an API call from client device 110A to communication services platform 120.

For example, client device 110A, via a GUI of application 154, can display the subset of user accounts (based on the user account identifiers) that are available to receive the transfer of the conversation. The user of client device 110Z can select a GUI element designating a particular one of the subset of user accounts, which causes the client device 110A to send an API call to communication services platform 120 requesting an initiation of a transfer of the messaging conversation to the selected user account. In some embodiments, the request from client device 110A includes a client account identifier of the selected user account. The request from client device 110A can include metadata as described herein, such as the messaging conversation telephone number.

At operation 324, communication services platform 120 transfers, to client device 110Z, the messaging conversation to the selected user account to facilitate a continuation of the messaging conversation with recipient device 210. In some embodiments, transferring the messaging conversation includes transferring to client device 110Z the messaging conversation history associated with the messaging conversation. As noted above, the message history can include one or more of the messages of the messaging conversation and the metadata. In some embodiments, transferring the messaging conversation includes transferring the messaging conversation telephone number that is associated with the messaging conversation to the client device 110Z. In some embodiments, the communication services platform 120 can identify the telephone number or IP address of the client device 110Z using a record that associated the aforementioned with the user account (e.g., user account Z).

In some embodiments, client device 110Z can receive a transfer request identifier that allows client device 110Z to select whether or not to receive the transfer. If the transfer request is accepted, communication services platform 120 can initiate the transfer of the messaging conversation to client device 110Z. If the transfer request is not accepted, communication services platform 120 can inform client device 110A of the transfer denial. Operations 320 and 322 can be repeated until a transfer request is accepted by a corresponding user account.

In some embodiments, client device 110Z can receive an indication that the transfer of a messaging conversation is occurring or has occurred. For example, a notification of a pending messaging conversation transfer can be sent to client device 110Z. In some instances, the notification can be displayed at client device 110Z via a GUI of application 154. In some embodiments, the transfer of the messaging conversation can cause the GUI of application 154 to display the messages of the messaging conversation at client device 110Z. For example, the user of client device 110Z can select the transferred conversation and cause the messages of the messaging conversation (e.g., messages between client device 110A and recipient device 210) to be displayed at the GUI of application 154.

At operation 326, communication services platform 120 sends to client device 110A an indication that the transfer of the messaging conversation has occurred.

At operation 328, client device 110A sends to communication services platform 120 a request to remove client device 110A (e.g., user account A) from the messaging conversation. In some embodiments, client device 110Z sends the request responsive to receiving the confirmation of the transfer of the messaging conversation as described with respect to operation 326. In some embodiments, the request to remove client device 110A from the messaging conversation can include an API call sent from client device 110A to communication services platform 120. In some embodiments, the user account associated with client device 110A is removed from the conversation without the request described with respect to operation 328. In some embodiment, the communication services platform 120 removes the user account associated with client device 110A responsive to receiving the request to transfer the messaging conversation as described with respect to operation 324.

At operation 330, client device 110Z can continue the messaging conversation with recipient device 210. At operation 330, client device 110Z can send a message (e.g., message C) to client device 110Z, via communication services platform 120. At operation 332, communication services platform 120 stores the message (e.g., message C) and the metadata. At operation 334, communication services platform 120 sends the message (e.g., message C) of the messaging conversation to recipient device 210.

It can be noted that the messaging conversation between client device 110Z and recipient device 210 can be similar to the messaging conversation between client device 110A and recipient device 210 as described with respect to operations 302 through 314. For the sake of brevity the description will not be repeated here. It should be appreciated that operations 302 through 314 can apply to the messaging conversation between client device 110Z and recipient device 210.

In some embodiments, the same messaging conversation telephone number can be used for the messaging conversation irrespective of the user account that is participating in the message conversation. In some embodiments, the messages from user account A of client device 110A and messages from user account Z of client device 110Z both appear, from the perspective of recipient device 210, to be from the same telephone number (e.g., messaging conversation telephone number).

In some embodiments, the transfer of the messaging conversation to the client device 110Z is an unannounced transfer that refrains from providing a notification associated with the messaging conversation indicating that the transfer of the messaging conversation has occurred. From the perspective of the client device 110Z, the messages of messaging conversation appear to be originating from the same telephone number (e.g., messaging conversation telephone number). In some embodiments, there may not be an identifier (e.g., indication) provided to the recipient device 210 that indicates that a transfer of the messaging conversation has occurred. In other embodiments, the transfer is an announced transfer. For example, communication services platform 120 can provide a notification (such as an additional message) indicating that the messaging conversation is transferred to another user account (e.g., agent) even though the messages of the messaging conversation originate and continue to originate from the same messaging conversation telephone number.

FIG. 3B illustrates a sequence diagram of communications between components of a system to transfer a messaging conversation using a messaging manager, in accordance with embodiments of the disclosure. Diagram 350 illustrates communication services platform 120, client device 110A, client device 110B, client device 110Z, and recipient device 210. In some embodiments, one or more of communication services platform 120, client device 110A, client device 110B, or client device 110Z using application 154, an in particular messaging conversation transfer module 151 implement the operations depicted in diagram 350.

It can be noted that some operations of diagram 350 can be the similar or the same as the operations described with respect to FIG. 3B. For the sake of brevity, the descriptions of operations of diagram 350 can reference the same or similar operations of diagram 300 to incorporate the description of the following operations.

In some embodiments, messaging conversation transfer module 151 can implement a messaging conversation manager (e.g., messaging manager or messaging conversation manager module). The messaging conversation manager can provide access to a messaging conversation service, which can cause a display of a GUI of application 154 that presents multiple messaging conversations between different user accounts and corresponding recipient devices 210. The messaging conversation manager service can allow a user to view the messaging conversations, contribute to the messaging conversations, and transfer the messaging conversations to different user accounts. It can be noted that in some embodiments, the client device 110 accessing the messaging conversation manager service can view and transfer messaging conversations in which the client device 110 or corresponding user is not participating. For instance, client device 110A can transfer a messaging conversation between client device 110B and recipient device 210 to client device 110Z.

In an illustrative example, client device 110A can access the messaging conversation manager service to view the messaging conversations of all the user accounts of the organization. The messaging conversations can include the messaging conversation(s) of client device 110A, the messaging conversation(s) of client device 110B and the messaging conversation(s) of client device 110Z, for example. Client device 110A can view all the messages of the various messaging conversations and receive updates to the messaging conversations to view additional messages added to the messaging conversation in real-time.

At operation 352, client device 110B sends a message (e.g., message A) to recipient device 210 via communication services platform 120. Operation 352 can be similar to operation 302 of FIG. 3A.

At operation 354, communication services platform 120 stores the message (e.g., message A) and the metadata. Operation 354 can be similar to operation 304 of FIG. 3A.

At operation 356, communication services platform 120 can send the message (e.g., message A) to recipient device 210. Operation 356 can be similar to operation 306 of FIG. 3A. In some embodiments, the messaging conversation between client device 110B and recipient device 210 can include one or more messages in a messaging conversation. Operations 308 through 314 can also be applied to diagram 350 of FIG. 3B.

At operation 358, client device 110A sends a request (e.g., API call) to communication services platform 120 to access the messaging conversation manager service. For example, client device 110Z can display a GUI of application 154. The GUI may have a GUI element to request the messaging conversation manager service. The user may select the GUI element, which causes an API call to be sent from client device 110A to communication services platform 120 to request access to the messaging conversation manager service. In another example, the request to access the messaging conversation manger service can occur at login of the application 154 (e.g., automatic based on user permissions).

At operation 360, communication services platform 120 can perform an authorization operation to determine whether the user account associated with client device 110B is authorized to access the messaging conversation manager service. For example, communication services platform 120 can search a record or policy to determine whether user account B of client device 110B is authorized to access the messaging conversation manager service. If authorized, communication services platform 120 proceeds to operation 362. If not authorized, communication services platform 120 returns an notification to client device 110B that user account B is denied access to the messaging conversation manager service (e.g., the data thereof).

At operation 362, communication services platform 120 sends the multiple messaging conversations and/or metadata to client device 110A pursuant to the request in operation 358 (e.g., if authorized to access the messaging conversation manager service). Subsequent to receiving the messaging conversations, client device 110A can display the various messaging conversations at the GUI of the application 154. For example, the client device 110A can display the message content of the messages of each messaging conversation, the participants in the messaging conversation, and so forth.

At operation 364, client device 110A sends a request to communication services platform 120 to identify, among multiple user accounts associated with the organization, a subset of user account that are available to receive a transfer of a particular messaging conversation with recipient device 210. Operation 364 can be similar to operation 316 of FIG. 3A.

At operation 366, communication services platform 120 identifies, among the set of user accounts associated with the organization, a subset of user accounts that are available to receive the transfer of the messaging conversation with recipient device 210. Operation 366 can be similar to operation 318 of FIG. 3A.

At operation 368, communication services platform 120 can send a response to the request described with respect to operation 316. For example, communication services platform 120 can send user account identifiers for the subset of user accounts to client device 110A. Operation 368 can be similar to operation 320 of FIG. 3A.

In some embodiments, operations 364 through 368 can be performed as part of operation 358 (e.g., request to view messaging conversation manager). For example, responsive to receiving a request from client device 110A to access the messaging conversation manager service, communication services platform 120, can identify the subset of user accounts that are available to receive a transfer of a messaging conversation and send the messaging conversations associated with the subset of user accounts to client device 110A for display.

At operation 370, client device 110A can send a request to communication services platform 120 to transfer a particular one of the messaging conversations to a user account identified among the subset of user accounts provided by communication services platform 120. Operation 370 can be similar to operation 322 of FIG. 3A.

At operation 372, communication services platform 120 transfers, to client device 110Z, the messaging conversation to the selected user account to facilitate a continuation of the messaging conversation with recipient device 210. Operation 372 can be similar to operation 324 of FIG. 3A.

At operation 374, client device 110Z can continue the messaging conversation with recipient device 210. At operation 374, client device 110Z can send a message (e.g., message B) to recipient device 210, via communication services platform 120. At operation 376, communication services platform 120 stores the message and metadata. At operation 378, communication services platform 120 sends the message of the messaging conversation to recipient device 210.

It can be noted that the messaging conversation between client device 110Z and recipient device 210 can be similar to the messaging conversation between client device 110A and recipient device 210 as described with respect to operations 302 through 314 of FIG. 3A. For the same of brevity the description will not be repeated here. It should be appreciated with operations 302 through 314 of FIG. 3A can apply to the messaging conversation between client device 110Z and recipient device 210 with respect to FIG. 3B.

In some embodiments, the same messaging conversation telephone number can be used for the messaging conversation irrespective of the user account that is participating in the message conversation. In some embodiments, the messages from user account B of client device 110B and messages from user account Z of client device 110Z both appear from the perspective of the recipient device 210 to be from the same telephone number (e.g., messaging conversation telephone number).

In some embodiments, the transfer of the messaging conversation to the client device 110Z is an unannounced transfer that refrains from providing a notification associated with the messaging conversation indicating that the transfer of the messaging conversation has occurred, as further described above with respect to FIG. 3A.

At operation 380, communication services platform 120 can send updated messaging conversation histories and metadata to client device 110A. For example, client device 110A can receive the new messages sent between client device 110Z and recipient device 210 so that the messaging conversation manager GUI of application 154 at client device 110A displays the new messages of the messaging conversation in real-time.

FIG. 4 and FIG. 5 illustrate methods 400 and 500, respectively. Methods 400 and/or 500 and/or each of the aforementioned methods' individual functions, routines, subroutines, or operations can be performed by a processing device, having one or more processing units (CPU) and memory devices communicatively coupled to the CPU(s). In some embodiments, the aforementioned methods can be performed by a single processing thread or alternatively by two or more processing threads, each thread executing one or more individual functions, routines, subroutines, or operations of the method. The aforementioned methods as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, methods 400 and 500 are performed by messaging conversation transfer module 151 described in FIGS. 1 and 2. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1-3B may be used herein to help describe FIG. 4-5.

FIG. 4 depicts a flow diagram of an example method 400 of transferring a messaging conversation, in accordance with some embodiments of the disclosure. In some embodiments, method 400 can be performed by communication services platform 120, and in particular messaging conversation transfer module 151 of communication services platform 120.

At operation 402, processing logic receives a first request to identify, among a set of user accounts, a subset of user accounts that are available to receive a transfer of a messaging conversation with a recipient device. In some embodiments, processing logic receives, via a first application programming interface (API) call from a first client device associated with a first user account, a first request to identify, among a set of user accounts, a subset of user accounts that are available to receive a transfer of a messaging conversation with a recipient device.

In some embodiments, the messaging conversation is associated with a first telephone number (e.g., messaging conversation telephone number).

At operation 404, processing logic identifies, among the user accounts, the subset of user accounts that satisfy one or more evaluation criteria. In some embodiments, processing logic identifies, among the set of user accounts, the subset of user accounts that satisfy one or more evaluation criteria corresponding to one or more of login status of the subset of user accounts or activity status of the subset of user accounts.

At operation 406, processing logic sends a first response identifying the subset of user accounts that are available to receive the transfer of the messaging conversation. In some embodiments, responsive to receiving the first request, processing logic sends, to the first client device, a first response identifying the subset of user accounts that are available to receive the transfer of the messaging conversation.

At operation 408, processing logic receives a second request to transfer the messaging conversation to a second user account identified among the subset of user accounts. In some embodiments, processing logic receives, via a second API call from the first client device, a second request to transfer the messaging conversation to a second user account identified among the subset of user accounts.

At operation 410, processing logic transfers the messaging conversation to a second user account to facilitate a continuation of the messaging conversation with the recipient device. In some embodiments, responsive to receiving the second request, processing logic transfers the messaging conversation to a second user account to facilitate a continuation of the messaging conversation with the recipient device.

In some embodiments, to transfer the messaging conversation to the second user account, processing logic transfers, to the second client device associated with the second user account, a message history associated with the messaging conversation. The message history includes first messages sent from the first client device to the recipient device.

In some embodiments, to transfer the messaging conversation to the second user account, processing logic transfers the first telephone number associated with the messaging conversation. The first messages sent from the first client device to the recipient device are configured for identification by the recipient device as originating from the first telephone number.

In some embodiments, the continuation of the messaging conversation with the recipient device includes second messages sent from the second client device to the recipient device. The second messages are configured for identification by the recipient device as originating from a same telephone number as the first telephone number.

In some embodiments, the transfer of the messaging conversation to the second client device is an unannounced transfer that refrains from providing a notification associated with the messaging conversation indicating that the transfer has occurred.

At operation 412, processing logic removes the first user account from the messaging conversation. In some embodiments, responsive to receiving the second request, processing logic removes the first user account from the messaging conversation.

In some embodiments, the messaging conversation includes first messages using one of a short messaging service (SMS) channel, a multimedia messaging service (MMS) channel, or an instant messaging service channel. In some embodiments, the messaging conversation excludes messages using an electronic mail (email) channel.

FIG. 5 depicts a flow diagram of an example method 500 of transferring a messaging conversation, in accordance with some embodiments of the disclosure. In some embodiments, method 500 can be performed by client device 110, and in particular messaging conversation transfer module 151 of client device 110.

At operation 502, processing logic sends a first request to identify, among a set of user accounts, a subset of user accounts that are available to receive a transfer of a messaging conversation with a recipient device. In some embodiments, processing logic sends, via a first application programming interface (API) call from a first client device associated with a first user account, a first request to identify, among a set of user accounts, a subset of user accounts that are available to receive a transfer of a messaging conversation with a recipient device.

At operation 504, processing logic receives a first response identifying the subset of user accounts that are available to receive the transfer of the messaging conversation. In some embodiments, processing logic receives, at the first client device in response to sending the first request, a first response identifying the subset of user accounts that are available to receive the transfer of the messaging conversation.

At operation 506, processing logic sends a second request to transfer the messaging conversation to a second user account identified among the subset of user accounts. In some embodiments, processing logic sends, via a second API call from the first client device, a second request to transfer the messaging conversation to a second user account identified among the subset of user accounts.

At operation 508, processing logic causes the transfer of the messaging conversation to a second user account to facilitate a continuation of the messaging conversation with the recipient device. In some embodiments, processing logic causes, based on the second request, the transfer of the messaging conversation to a second user account to facilitate a continuation of the messaging conversation with the recipient device.

In some embodiments, the messaging conversation is associated with a first telephone number.

In some embodiments, to cause the transfer of the messaging conversation to the second user account, processing logic causes a transfer, to the second client device associated with the second user account, a message history associated with the messaging conversation. The message history comprising first messages sent from the first client device to the recipient device.

In some embodiments, to cause the transfer the messaging conversation to the second user account, processing logic causes a transfer of the first telephone number associated with the messaging conversation. The he first messages sent from the first client device to the recipient device are configured for identification by the recipient device as originating from the first telephone number.

In some embodiments, the continuation of the messaging conversation with the recipient device includes second messages sent from the second client device to the recipient device. The second messages are configured for identification by the recipient device as originating from a same telephone number as the first telephone number.

In some embodiments, the transfer of the messaging conversation to the second client device is an unannounced transfer that refrains from providing a notification associated with the messaging conversation indicating that the transfer has occurred.

In some embodiments, the messaging conversation includes first messages using one of a short messaging service (SMS) channel, a multimedia messaging service (MMS) channel, or an instant messaging service channel. In some embodiments, messages of the messaging conversation exclude messages from an email channel.

Figure 6:
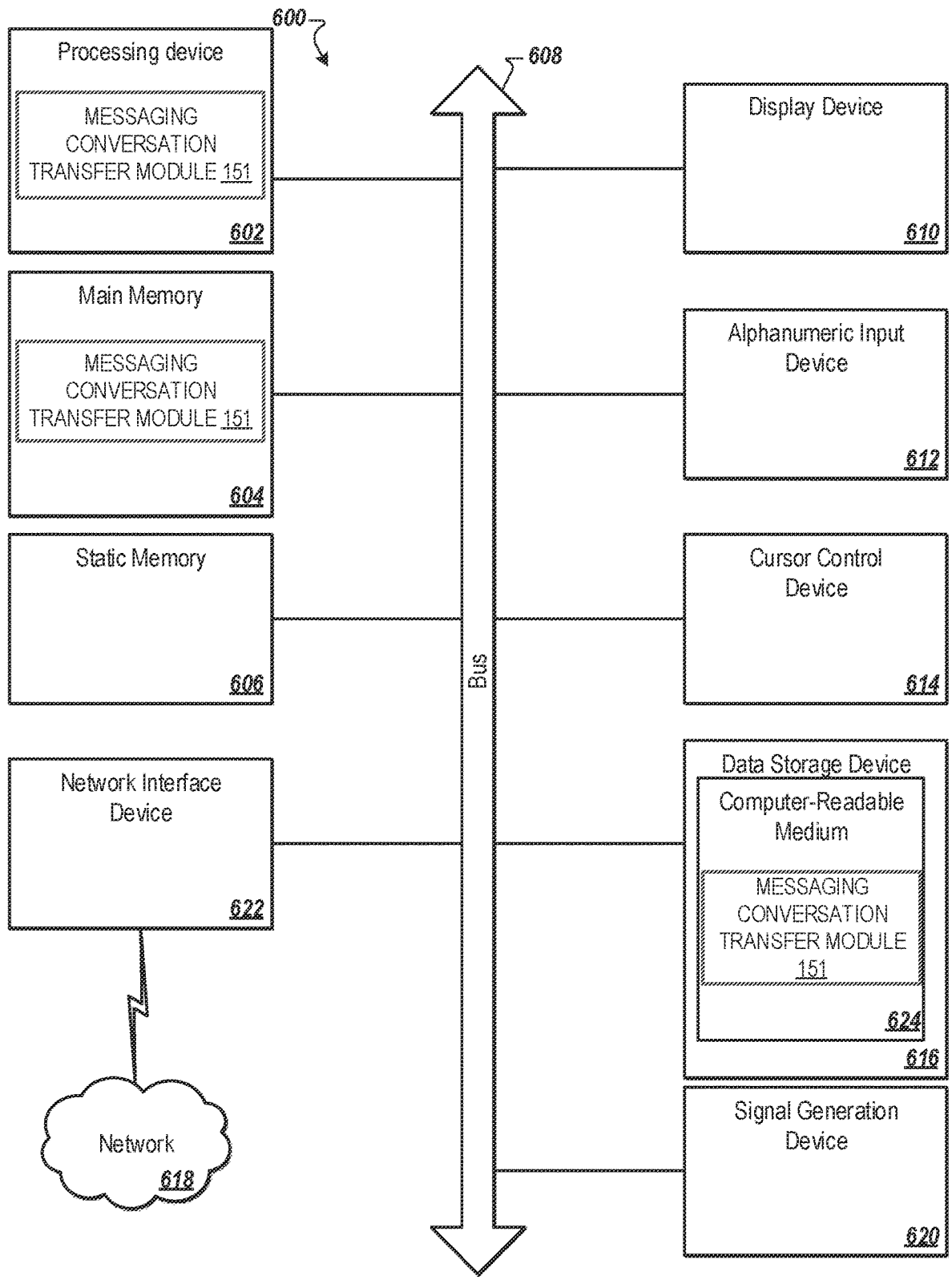
FIG. 6 is a block diagram illustrating an exemplary computer system, in accordance with some embodiments of the disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed by computer system 600, cause computer system 600 to perform one or more operations of messaging conversation transfer module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and messaging conversation transfer module 151 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 of messaging conversation transfer module 151 embodying any one or more of the methodologies or functions described herein. The sets of instructions of the system architecture 100 and of messaging conversation transfer module 151 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
receiving, by a communication services platform via a first application programming interface (API) call from a first client device associated with a first user account, a first request to identify, among a plurality of user accounts, a subset of user accounts that are available to receive a transfer of a messaging conversation that exchanged text messages between the first client device and a recipient device, wherein the subset of user accounts are different from the first user account, wherein the text messages of the messaging conversation are sent from a first telephone number associated the first user account and the first client device;
identifying, among the plurality of user accounts permitted to receive the messaging conversation, the subset of user accounts that are associated with an activity status indicating currently active to determine the subset of user accounts that are available to receive the transfer of the messaging conversation;
responsive to receiving the first request, sending, by the communication services platform to the first client device, a first response identifying the subset of user accounts that are available to receive the transfer of the messaging conversation;
receiving, by the communication services platform via a second API call from the first client device, a second request to transfer the messaging conversation to a second user account identified among the subset of user accounts; and
responsive to receiving the second request,
transferring by the communication services platform, the messaging conversation including the text messages exchanged between the first client device and the recipient device to the second user account associated with a second client device to facilitate a continuation of the messaging conversation with the recipient device, and
transferring the first telephone number to the second user account to facilitate that new text messages of the messaging conversation sent using the second client device are sent from the first telephone number.

2. The method of claim 1, wherein the messaging conversation is associated with the first telephone number.

3. The method of claim 2, wherein transferring the messaging conversation to the second user account comprises:
transferring, to the second client device associated with the second user account, a message history associated with the messaging conversation, the message history comprising the text messages exchanged between the first client device and the recipient device.

4. The method of claim 3, wherein the continuation of the messaging conversation with the recipient device comprises the new text messages sent from the second client device to the recipient device, and wherein the new text messages are configured for identification by the recipient device as originating from the first telephone number.

5. The method of claim 1, wherein the transfer of the messaging conversation to the second user account is an unannounced transfer that refrains from providing a notification associated with the messaging conversation indicating that the transfer has occurred.

6. The method of claim 1, further comprising:
identifying, among the plurality of user accounts, the subset of user accounts that satisfy one or more evaluation criteria corresponding to one or more of login status of the subset of user accounts or activity status of the subset of user accounts.

7. The method of claim 1, further comprising:
responsive to receiving the second request, removing the first user account from the messaging conversation.

8. The method of claim 1, wherein the messaging conversation comprises the text messages using one of a short messaging service (SMS) channel, a multimedia messaging service (MMS) channel, or an instant messaging service channel.

9. A method, comprising:
sending, to a communication services platform via a first application programming interface (API) call from a first client device associated with a first user account, a first request to identify, among a plurality of user accounts, a subset of user accounts that are available to receive a transfer of a messaging conversation that exchanged text messages between the first client device and a recipient, wherein the subset of user accounts are different than the first user account, wherein the text messages of the messaging conversation are sent from a first telephone number associated the first user account and the first client device;
identifying, among the plurality of user accounts permitted to receive the messaging conversation, the subset of user accounts that are associated with an activity status indicating currently active to determine the subset of user accounts that are available to receive the transfer of the messaging conversation;
receiving, from the communication services platform and at the first client device in response to sending the first request, a first response identifying the subset of user accounts that are available to receive the transfer of the messaging conversation;
sending, via a second API call to the communication services platform and from the first client device, a second request to transfer the messaging conversation to a second user account identified among the subset of user accounts; and
causing, based on the second request, (i) the transfer of the messaging conversation including the text messages exchanged between the first client device and a recipient device to the second user account associated with a second client device to facilitate a continuation of the messaging conversation with the recipient device, and (ii) transfer of the first telephone number to the second user account to facilitate that new text messages of the messaging conversation sent using the second client device are sent from the first telephone number.

10. The method of claim 9, wherein the messaging conversation is associated with the first telephone number.

11. The method of claim 10, wherein causing the transfer of the messaging conversation to the second user account comprises:
   causing a transfer, to the second client device associated with the second user account, a message history associated with the messaging conversation, the message history comprising the text messages exchanged between the first client device and the recipient device.

12. The method of claim 11, wherein the continuation of the messaging conversation with the recipient device comprises the new text messages sent from the second client device to the recipient device, and wherein the new text messages are configured for identification by the recipient device as originating from the first telephone number.

13. The method of claim 9, wherein the transfer of the messaging conversation to the second user account is an unannounced transfer that refrains from providing a notification associated with the messaging conversation indicating that the transfer has occurred.

14. The method of claim 9, wherein the messaging conversation comprises the text messages using one of a short messaging service (SMS) channel, a multimedia messaging service (MMS) channel, or an instant messaging service channel.

15. A non-transitory computer-readable medium comprising instructions that, responsive to execution by a processing device, cause the processing device to perform operations comprising:
   sending, to a communication services platform via a first application programming interface (API) call from a first client device associated with a first user account, a first request to identify, among a plurality of user accounts, a subset of user accounts that are available to receive a transfer of a messaging conversation that exchanged text messages between the first client device and a recipient device, wherein the subset of user accounts are different than the first user account, wherein the text messages of the messaging conversation are sent from a first telephone number associated the first user account and the first client device;
   identifying, among the plurality of user accounts permitted to receive the messaging conversation, the subset of user accounts that are associated with an activity status indicating currently active to determine the subset of user accounts that are available to receive the transfer of the messaging conversation;
   receiving, from the communication services platform and at the first client device in response to sending the first request, a first response identifying the subset of user accounts that are available to receive the transfer of the messaging conversation;
   sending, to the communication services platform via a second API call from the first client device, a second request to transfer the messaging conversation to a second user account identified among the subset of user accounts; and
   causing, based on the second request, (i) the transfer of the messaging conversation including the text messages exchanged between the first client device and the recipient device to the second user account associated with a second client device to facilitate a continuation of the messaging conversation with the recipient device, and (ii) a transfer of the first telephone number to the second user account to facilitate that new text messages of the messaging conversation using the second client device are sent form the first telephone number.

16. The non-transitory computer-readable medium of claim 15, wherein the messaging conversation is associated with the first telephone number.

17. The non-transitory computer-readable medium of claim 16, wherein causing the transfer of the messaging conversation to the second user account further comprises:
   causing a transfer, to the second client device associated with the second user account, a message history associated with the messaging conversation, the message history comprising the text messages exchanged between the first client device and the recipient device.

18. The non-transitory computer-readable of claim 17,
   wherein the continuation of the messaging conversation with the recipient device comprises the new text messages sent from the second client device to the recipient device, and wherein the new text messages are configured for identification by the recipient device as originating from the first telephone number.

* * * * *